April 1, 1952  H. ALLEN  2,591,038
GATE VALVE
Filed April 1, 1946  3 Sheets-Sheet 1

HERBERT ALLEN
INVENTOR
BY
ATTORNEYS

Patented Apr. 1, 1952

2,591,038

UNITED STATES PATENT OFFICE 2,591,038

GATE VALVE

Herbert Allen, Houston, Tex., assignor to Cameron Iron Works, Houston, Tex., a corporation of Texas Application April 1, 1946, Serial No. 658,778

2 Claims. (Cl. 251—156)

This invention relates in general to valves and more particularly has reference to so-called gate valves having novel features of construction.

Valves for controlling the flow of fluids have been made of various types. The so-called gate type of valve in which a sliding or swinging gate is positioned to move in between two opposed ports surrounded by seats has been extensively used in many installations. The sliding type of gate valve generally comprises a casing having inlet and outlet ports, a gate in said casing, a removable bonnet to permit installation and removal of said gate, and a gate actuating stem extending through a suitable opening in said removable bonnet. In valves of this type the gate is usually seated by a wedging action. The wedging action of the gate relative to the seats often results in a stuck gate and makes it difficult to actuate the valve. This is especially true in the larger size valves.

To overcome the latter difficulty various mechanisms have been devised to assist in the seating of the gate on its seats and the removal therefrom. Also expandible and contractible gates have been constructed to facilitate seating and unseating of the gate.

Difficulty has also been encountered in some instances due to leaks in the joint between the casing and the removable bonnet.

All of these devices and mechanisms have been of varying degrees of complexity. In addition they have not always solved the problem in a satisfactory and economical manner.

An object of this invention is to provide a valve construction which avoids the difficulties of the prior art.

Another object is to provide a gate valve in which the bonnet is integral with the casing.

A further object of this invention is to provide a gate valve in which the gate is of the conduit type, yet may be passed through one opening in the casing wall which is surrounded by the connection between the fluid conduit and the valve casing to facilitate assembly, repair or dismantling of the valve.

Still another object is to provide an integral gate valve casing unit having openings adapted to be sealed by conduit connections, wherein one of said openings is large enough to pass the internal mechanism of the valve including a conduit type gate when the valve is assembled, dismantled or repaired.

A still further object of this invention is to provide a valve according to the preceding objects in which seals are effected with plastic packing.

Other objects will be more apparent from the showing in the drawings and from the following description.

To facilitate an understanding of the present invention reference is made to the accompanying drawings, in which.

Figure 1:
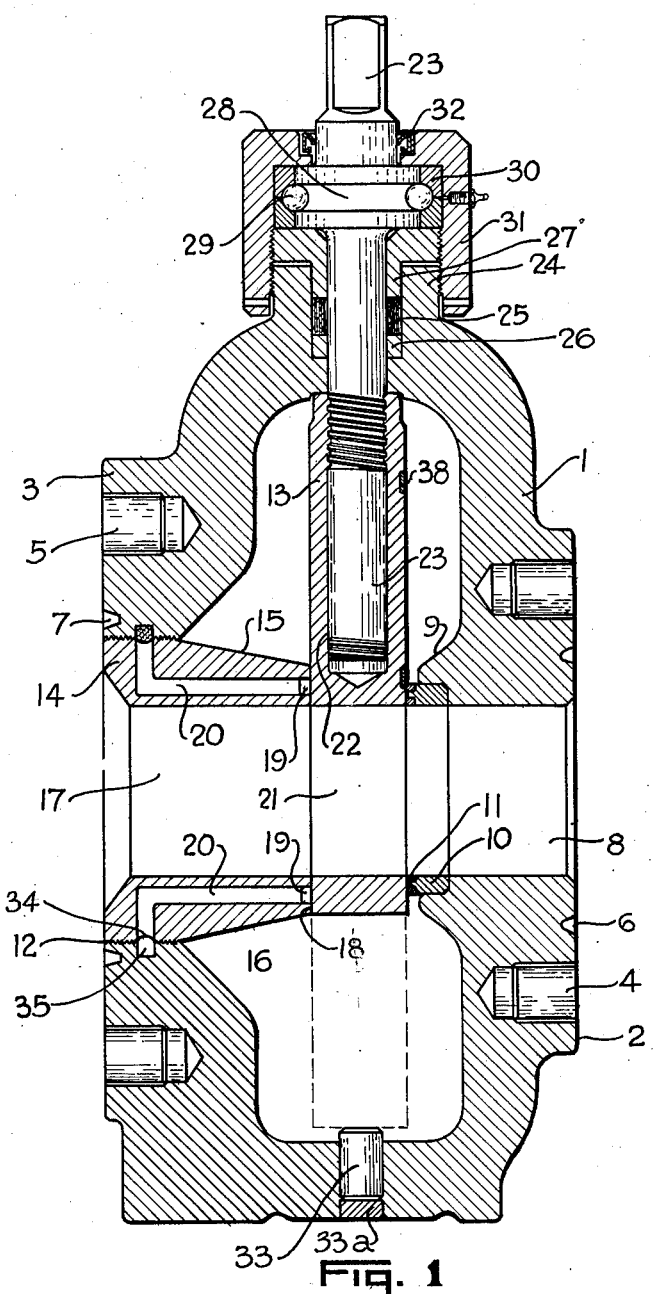
Figure 1 is a vertical sectional view of a gate valve constructed according to the present invention.
Figure 2:
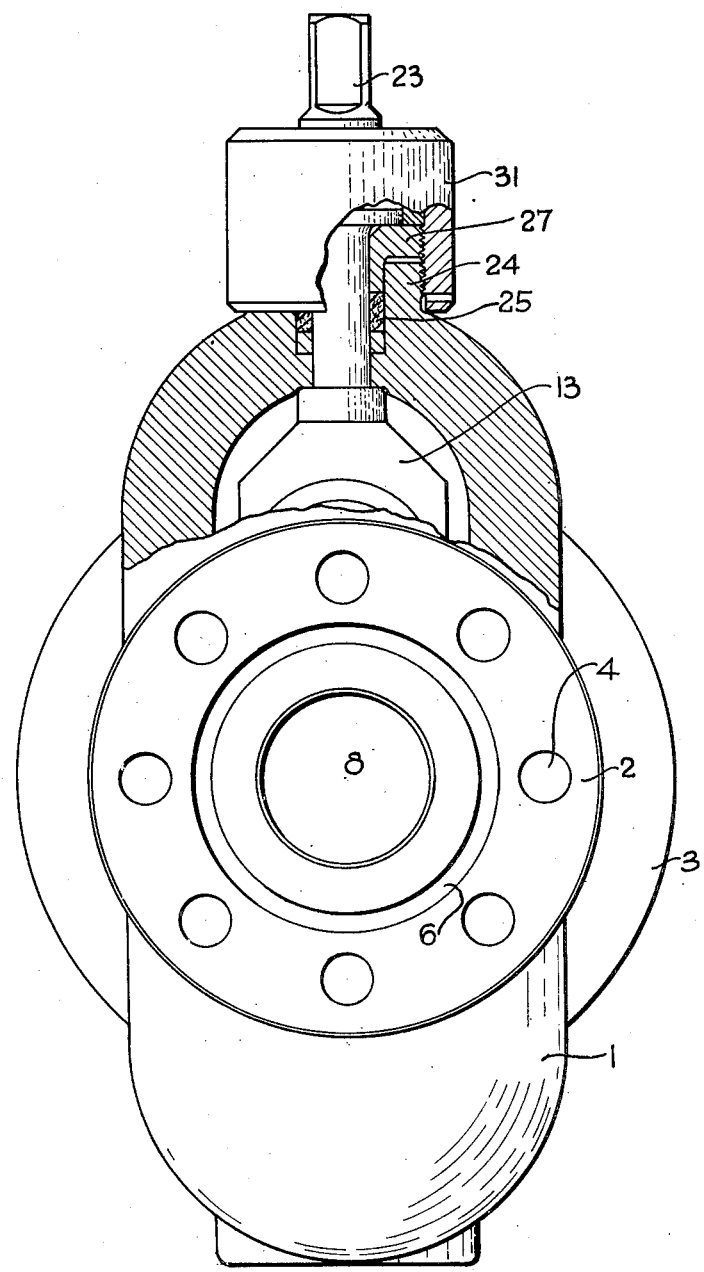
Fig. 2 is a side elevational view partly in section of the valve shown in Fig. 1.

Referring to the drawings, the gate valve of the present invention comprises a casing or housing 1 which may be a unitary structure formed by casting or by suitably joining two or more sections together as for example by welding. A coupling flange 2 is formed on one side of the casing 1 and a second coupling flange 3 is formed on the opposite side of the casing. The two flanges are provided with stud receiving recesses 4 and 5 respectively. Flange 2 is provided with a seal ring receiving annular recess 6 and flange 3 is provided with a similar recess 7.

Casing 1 is provided with a flow port 8 centrally of the flange 2. It will be noted that the interior of the casing is provided with a boss 9 surrounding the port 8 and which is recessed at its inner periphery to receive a valve seat insert 10, the inner edge of which projects slightly from the boss 9 and is tipped with wear resisting material 11.

Flange 3 has a central threaded opening 12 extending through the wall of the casing. Opening 12 is sufficiently large to permit the insertion of the gate 13 of the conduit type, seat insert 10, and other elements within the casing 1 as well as to accommodate their removal. Furthermore, this opening 12 has its inner extremity spaced substantially from the position which the gate 13 is to occupy in operation and the inner walls of the casing are flared away from the upper and lower portions of the inner end of the opening 12 so that the long conduit type gate may be inserted therethrough either end first, moved to the corresponding end of the valve chamber, and then the other end of the gate swung through the opening 12. For this purpose it is necessary that the distance from at least one extremity of the valve chamber to the opposite extremity of the opening 12 be as great as the maximum dimension of the gate, that the opening 12 be spaced substantially from the normal operative position of the gate and the adjacent walls of the valve chamber flared inwardly from the opening to permit the gate when one end is adjacent one end of the valve chamber to be tilted until its other end projects from the opening 12. A removable seat member 14 in the form of an externally threaded tubular body is provided. The member 14 has a long portion 15 extending inwardly into the valve chamber 16 of the casing 1 to the operative position of the gate 13. Extending axially through member 14 is a flow port 17 which is aligned with flow port 8. The inner end face 18 of the member 14 serves as a seat for the gate 13. A seal for this seat is provided by the peripheral groove or recess 19 for receiving plastic packing material supplied thereto through ducts or channels 20.

As shown in Fig. 1, the gate 13 is positioned to slide vertically between the seats 10 and 18 disposed on opposite sides thereof. Adjacent its lower portion the gate 13 is provided with a flow duct or conduit 21 of a size equal to the size of the flow ports 8 and 17 of the valve casing whereby registry of duct 21 with the ports 8 and 17 affords a full free flow of fluid through the valve. Gate 13 is provided with a threaded bore 22 in its upper portion for reception of an externally threaded valve stem 23, which projects through an opening in the top of the casing 1. As illustrated, the top of the casing 1 is formed with a boss 24 which is externally threaded and provided with a bore of larger diameter than stem 23. Suitable packing material 25 is positioned in the bore in boss 24 and is compressed between a washer 26 and a ram or follower 27.

It will be noted that stem 23 fixedly carries an inner race 28 of a ball thrust bearing which is grooved to receive the balls 29. The outer race 30 comprises two parts which are received within a cap 31. Follower 27 has a portion of large diameter which is threadedly mounted within the cap 31 to retain the ball bearing 28, 29, 30 within the cap. Stem 23 has its outer end extending through an opening in cap 31, fitted with a suitable grease seal 32. The outer extremity of stem 23 is squared or otherwise formed to receive a wrench or hand wheel (not shown). After the stem 23 is assembled in the cap 31 and the bearing 28, 29, 30 is properly secured by element 27, the stem is inserted through the opening in the top of the casing and started into the bore 22 of gate 13. Then the cap 31 is screwed onto the boss 24 to tighten the packing 25 about the stem and to anchor the bearing 28, 29, 30.

Gate 13 is constructed to abut the upper portion of casing 1 when the passageway 21 is in register with ports 8 and 17. A stop 33 in the bottom of the casing serves to limit the downward movement of the gate and is mounted in an opening closed by a plug 33a, which may be welded in place.

Figure 3:
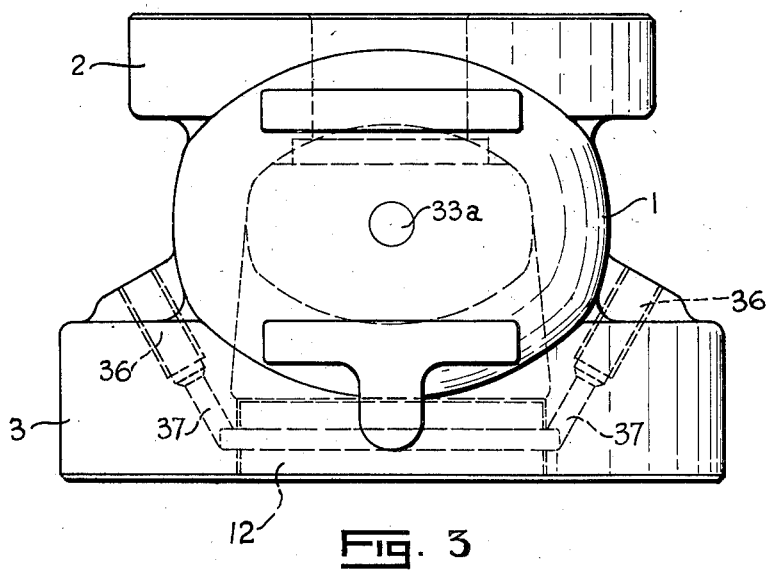
Fig. 3 is a bottom plan view of the valve illustrated in the preceding figures.

As hereinbefore mentioned plastic packing is used to form a seal between the inner face of the member 14 and the gate, which packing is supplied to groove 19 through ducts 20. These ducts communicate with a channel or groove 34 in the outer threaded surface of the member 14, which registers with a groove 35 in the threaded surface of the opening 12. Plastic packing is supplied to groove 35 from suitable reservoirs 36 through ducts 37, as shown in Fig. 3, suitable rams or feeding means for the plastic packing (not shown) being associated with the reservoirs 36.

After the gate 13 is assembled in the casing 1 and connected with stem 23 the member 14 is inserted in the opening 12 and the inner face 18 brought up against the gate 13 to the proper degree to press the gate between the end face 18 and the wear material 11 of seat 10. When plastic packing is supplied to the ducts and recesses a seal is effected between the gate and the inner surface 18 of member 14. If desired gate 13 may have a wearing surface 38 provided to cooperate with wear material 11.

It will be observed that the valve according to the present invention having a casing with an integral bonnet is not subject to the disadvantages of valves with removable bonnets especially as to leakage at the bonnet joint. By providing a large opening 12 for insertion of the gate and other parts within the casing, which opening is entirely within the means connecting and sealing the valve casing to an adjacent conduit or other member, possibility of leakage from the valve casing to the exterior is minimized. While a stem opening is formed in the casing, it being of small diameter it is relatively easily sealed with suitable packing material. Thus a valve of simple construction, of high efficiency and subject to minimum leakage is afforded by the present invention.

Having described my invention, I claim:

1. A gate valve comprising a casing with a valve chamber therein and a side opening therein communicating with the chamber; a seating member removably secured within the opening; a conduit type gate reciprocally mounted within the chamber; the casing, gate, and seating member having formed therein a flow passageway extending therethrough and intersecting the chamber, said gate controlling the passageway; said side opening having a diameter greater than the maximum width of the gate, the casing wall being so constructed and disposed that the distance from a portion of the edge of the opening to the opposing extremity of the chamber is greater than the maximum dimension of the gate; said opening being spaced laterally from the operative position of the gate a distance such that the gate if engaged with such extremity of the chamber and with the closest portion of the edge of said opening will clear the remaining portion of the edge of the opening sufficiently to provide for passing of the gate through the opening; said seating member when mounted in the opening having a portion, through which the flow passageway is formed, extending to the gate for sliding contact therewith.

2. In a gate valve, a body with a valve chamber therein and an opening in the side wall of the body, a seating member secured within the opening, a flow passageway extending through the body and its valve chamber and formed in part in and extending through the seating member, said valve chamber having one dimension at least three times the diameter of the flow passage, said body having a valve stem opening through its wall communicating with the chamber and aligned with said one dimension of the chamber, said first mentioned opening being offset laterally outwardly from the regular contour of the chamber, the walls of the body forming the chamber being tapered outwardly to said opening, and the distance from one extremity of the chamber to the opposite edge of said opening being greater than twice the diameter of the flow passageway.

HERBERT ALLEN.

REFERENCES CITED

The following references are of record in the file of this patent:

UNITED STATES PATENTS

| Number | Name | Date |
|---|---|---|
| 207,365 | Morse | Aug. 27, 1878 |
| 1,020,449 | Riggen | Mar. 19, 1912 |
| 1,578,349 | Nixon | Mar. 30, 1926 |
| 1,751,122 | Barker | Mar. 18, 1930 |
| 1,800,251 | Fox | Apr. 14, 1931 |
| 1,938,460 | Muff | Dec. 5, 1933 |
| 1,980,768 | Specht | Nov. 13, 1934 |
| 1,963,683 | Schaffer | June 19, 1934 |
| 2,006,715 | McCausland | July 2, 1935 |
| 2,433,638 | Volpin | Dec. 30, 1947 |

FOREIGN PATENTS

| Number | Country | Date |
|---|---|---|
| 508,737 | Germany | Oct. 4, 1930 |